United States Patent
Shimura et al.

(10) Patent No.: US 8,470,935 B2
(45) Date of Patent: Jun. 25, 2013

(54) SHAPE-MEMORY RESIN, MOLDED PRODUCT COMPOSED OF THE RESIN, AND METHOD OF USING THE MOLDED PRODUCT

(75) Inventors: Midori Shimura, Tokyo (JP); Kazuhiko Inoue, Tokyo (JP); Masatoshi Iji, Tokyo (JP)

(73) Assignee: NEC Corporation, Tokyo (JP)

( * ) Notice: Subject to any disclaimer, the term of this patent is extended or adjusted under 35 U.S.C. 154(b) by 77 days.

(21) Appl. No.: 12/741,688

(22) PCT Filed: Nov. 13, 2008

(86) PCT No.: PCT/JP2008/070686
§ 371 (c)(1),
(2), (4) Date: May 6, 2010

(87) PCT Pub. No.: WO2009/063943
PCT Pub. Date: May 22, 2009

(65) Prior Publication Data
US 2010/0240841 A1    Sep. 23, 2010

(30) Foreign Application Priority Data

Nov. 16, 2007 (JP) .................. 2007-298209
Mar. 13, 2008 (JP) .................. 2008-064163

(51) Int. Cl.
*C08G 63/91* (2006.01)
(52) U.S. Cl.
USPC ........... 525/411; 525/410; 525/415; 525/450; 525/452; 525/453; 525/437
(58) Field of Classification Search
USPC ............... 525/410, 411, 415, 450, 452, 453, 525/437
See application file for complete search history.

(56) References Cited

U.S. PATENT DOCUMENTS

| | | | |
|---|---|---|---|
| 6,388,043 B1 * | 5/2002 | Langer et al. | 528/80 |
| 2006/0025560 A1 * | 2/2006 | Inoue et al. | 528/272 |
| 2007/0148465 A1 * | 6/2007 | Shimura et al. | 428/411.1 |

FOREIGN PATENT DOCUMENTS

| | | |
|---|---|---|
| JP | 10-036477 | 2/1998 |
| JP | 10-147720 | 6/1998 |
| JP | 2002-504585 | 2/2002 |
| JP | 2006-077126 | 3/2006 |
| JP | 2006-342298 | * 12/2006 |
| JP | 2007-063360 | 3/2007 |
| JP | 2007-504330 | 3/2007 |
| JP | 2007-186684 | 7/2007 |
| JP | 2007-191557 | 8/2007 |
| JP | 2007-284643 | 11/2007 |
| JP | 2008-222883 | 9/2008 |
| WO | WO2005/056642 | 6/2005 |

OTHER PUBLICATIONS

International Search Report, PCT/JP2008/070686, Feb. 24, 2009.
Masao Karaushi, "Development of Materials for Shape Memory Polymers", CMC Publishing Co., LTD., pp. 30-43, 1989.
Engle et al., J. Macromol. Sci. Re. Macromol. Chem. Phys., vol. C33, No. 3, pp. 239-257, 1993.

* cited by examiner

Primary Examiner — Robert Jones, Jr.
(74) Attorney, Agent, or Firm — Young & Thompson

(57) ABSTRACT

There are provided: a shape-memory resin, which is formed from a polylactic acid derivative thereby enabling reduction of an environmental load, has an excellent shape-memory property, high strength, and high toughness, and with which a molded product with high durability, for example, an electronic equipments, particularly a wearable electronic equipments capable of freely changing the shape thereof or the like, can be shaped; and a molded product thereof. The shape-memory resin of the present invention has a three-dimensional structure, in which a polylactic acid derivative having two or more functional groups capable of forming a cross-linking site is cross-linked using a flexible polymer having a glass transition temperature (Tg) lower than 30° C. and having two or more functional groups capable of forming a cross-linking site, and a linker.

17 Claims, 1 Drawing Sheet

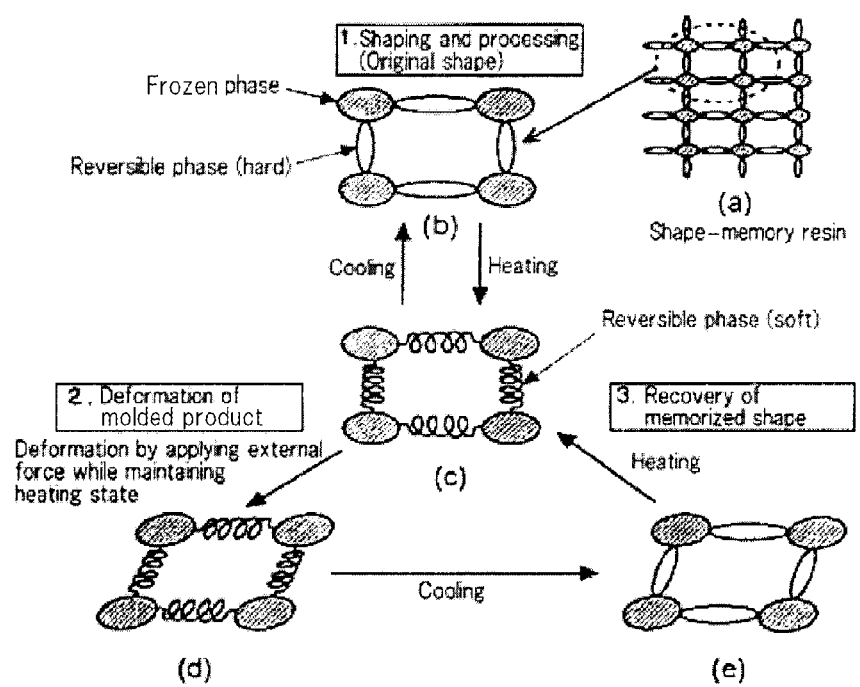

SHAPE-MEMORY RESIN, MOLDED PRODUCT COMPOSED OF THE RESIN, AND METHOD OF USING THE MOLDED PRODUCT

TECHNICAL FIELD

The present invention relates to: a shape-memory resin, which reduces environmental impact, performing shape-memory property, flexural strength and high elongation at break; a molded product using the same; and a method of using the molded product.

BACKGROUND ART

In recent years, concern about environmental problems has been increasing. Under such circumstances, in order to reduce carbon dioxide that causes global warming, and as an effective material alternative to petroleum that is an exhaustible resource, biomass-based resin, particularly, polylactic acid, has received attention. Polylactic acid has a relatively high melting point (150 to 180° C.), and it has strength comparable to that of a polystyrene. Thus, it is greatly expected that such polylactic acid will become widely used. However, polylactic acid is more expensive than petroleum-based resins, and it has no mechanical properties other than environmental compatibility, which are superior to those of petroleum-based resins. Due to such problems, polylactic acid has not yet become widespread. For polylactic acid to be used in a variety of products, it is important to add new functions to the polylactic acid to enhance the added value thereof.

A new function may be a shape-memory property that is an intelligent function. The shape-memory property is a property, in which a material can be deformed at a predetermined temperature, and such a desirably deformed shape can be fixed by cooling it to room temperature, and recovered to its original shape by heating it again. As materials having such shape-memory property, an shape-memory alloy material and a shape-memory resin have been conventionally known. Shape-memory alloys find use in pipe joints, a straightening teeth, and the like, whereas shape-memory resins in thermal contraction tubes and laminate materials, fastening pins, and medical equipments such as plaster casts. Unlike the shape-memory alloy, the shape-memory resin has the following merits. The resin can be processed into a complicated shape, has a high shape-recovery efficiency, light weight, readily colorable, and low cost. Because of these merits, the shape-memory resin is expected to enlarge the application fields.

The shape-memory resin is characteristically constituted of a reversible phase, which is composed of a non-cross-linked portion and flowable at a predetermined temperature or more (the Tg or melting point in the reversible phase), and a frozen phase, which is composed of a physical or chemical bonded site (cross-linking point).

As shown in FIG. 1, the shape-memory mechanism of a molded product using the shape-memory resin includes 3 steps, namely, memorizing a shape, deforming a molded product, and recovering the memorized shape, as described below.

1. Processed by Molding (Original)

When a shape-memory resin is processed by being heated, being melted, and being solidified, an initial shape (original shape) consisting of a frozen phase and a reversible phase (rigid state) (shown in FIG. 1(a), and a partially magnified view (b) of FIG. 1) is memorized.

2. Deformation of Molded Product

The molded product can be arbitrarily deformed at a temperature, at which only the reversible phase is melted but the frozen phase is not melted, that is, not less than the Tg or melting point of the reversible phase, thereby converting the reversible phase into a soft state (Stage (c) of FIG. 1); followed by applying external force to the molded product while maintaining its state (Stage (d) of FIG. 1). When the molded product thus deformed is cooled to a temperature of Tg or melting point of the reversible phase or lower, the reversible phase is also completely solidified, thereby fixing the deformed shape state (Stage (e) of FIG. 1).

3. Recovery of Memorized Shape

In the molded product arbitrarily deformed, the deformed state of the shape is maintained by the reversible phase forcibly fixed in the meantime. Therefore, when the temperature of the deformed product reached a temperature at which the reversible phase alone softens, the resin exhibits elasticity (rubber-like property) and comes to a stable state. In this way, its original shape is recovered (Stage (c) of FIG. 1). The initial state of the molded product shown in Stage (b) of FIG. 1 is brought back by further cooling to not more than Tg or the melting point.

A shape-memory resin used to produce the above-mentioned molded product can be classified into a thermosetting type and a thermoplastic type, depending on the situation of a frozen phase. In terms of shape-memory performance, the thermosetting type is superior to the thermoplastic type (Non-Patent Document 1). The thermosetting type shape-memory resin has the following advantage. The frozen phase of the thermosetting type shape-memory resin is composed of a covalently cross-linked structure. The resin is highly effective in preventing the fluidization of a resin, excellent in shape-memory and dimensional stability, and recovers the original shape at high speed. On the other hand, the binding force of the frozen phase of the thermoplastic type shape-memory resin is weaker than that of the thermosetting type shape-memory resin having covalent cross-linking, since the frozen phase of the thermoplastic type shape-memory resin is composed of physical cross linked structure for example crystalline part, glass-state region of a polymer, the entanglement of polymers, or a metal crosslink. Thereby, the thermoplastic type shape-memory resin is inferior in shape recovering property to the thermosetting type shape-memory resin.

By the way, there have been reported several cases in which a shape-memory property is imparted by three-dimensionally cross-linking polylactic acid via a chemical bonding. For example, there has been reported a shape-memory resin in which polylactic acid is cross-linked by irradiation with an active energy ray (Patent Document 1). However, since such crosslink by irradiation with an active energy ray does not adopt a perfect three-dimensional structure, the shape-memory performance of the concerned shape-memory resin is lower than that of a thermosetting resin. Moreover, since it requires high costs for equipments and a shaping process has a certain limit, it is difficult to produce a large product and the like.

The present inventors had already developed a thermo-reversible shape-memory resin, into the cross-linking site of which a covalently-bound thermo-reversible reaction is introduced, as a new material having the advantages of both a thermosetting resin and a thermoplastic resin (Patent Document 2). The thermo-reversible reaction is a reaction in which a bond is cleaved at a predetermined temperature and it is then rebound when cooled. This thermo-reversible reaction is described in Non-Patent Document 2. A shape-memory resin cross-linked by such thermo-reversible reaction has a frozen phase as a thermo-reversible cross-linking site and a reversible phase as a resin, and because of the two phases, the resin has a shape-memory property. Specifically, since the shape-memory resin is three-dimensionally cross-linked via a covalent bonding in a practical temperature region and it functions as a thermosetting resin, this resin has excellent shape recovering and dimensional stability, and a reduction in the shape recovery rate due to repeated deformation is suppressed. Since this resin functions as a thermoplastic resin when it is heated to a temperature at which the bond of the thermo-reversible cross-linking site is dissociated, the resin is melted and is remolded to another shape, namely, it can be recycled. Furthermore, when the recycled resin is cooled, the cross-linking site is associated, and the resin returns to a thermo-setting resin. Thus, excellent shape-memory ability can be reproduced. That is to say, this resin can be a shape-memory resin having both advantages such as excellent shape-memory performance and recyclability. The present inventors had developed a thermo-reversible shape-memory resin with further improved mechanical strength by introducing a chain structure capable of relaxing the inner strain of resin (Patent Document 3).

Polylactic acid having such cross-linking site by a thermo-reversible reaction has good mechanical strength, however it does not have sufficient toughness. If the toughness of the polylactic acid can be improved, it can be applied to produce high durable products, and the like.

As shape-memory polylactic acid having high toughness, there has been known polylactic acid cross-linked with a flexible segment, for example (Patent Document 4). However, the strength of such polylactic acid is not sufficient to be applied to durable products. Hence, it has been desired to develop a resin preferably used for high durable products.

Patent Document 1: JP10-147720A
Patent Document 2: WO2005/056642
Patent Document 3: JP2006-331921B
Patent Document 4: JP2002-504585A
Non-Patent Document 1: Masao KARAUSHI, "*Keijyo Kioku Polymer no Zairyo Kaihatsu* (Development of Materials for Shape Memory Polymers)" CMC Publishing CO., LTD., pp. 30-43, 1989
Non-Patent Document 2: Engle et al., J. Macromol. Sci. Re. Macromol. Chem. Phys., Vol. C33, No. 3, pp. 239-257, 1993

DISCLOSURE OF THE INVENTION

Problems to be Solved by the Invention

It is an object of the present invention to provide: a shape-memory resin, which is formed from a polylactic acid derivative, has an excellent shape memory-property, high strength, and high toughness, and high durable products, for example, electronic equipments, particularly wearable electronic equipments of which shapes can be reformed easily by users; and products thereof. It is another object of the present invention to provide: a shape-memory resin, in which a biodegradable resin is used to reduce an environmental load when discarded; and a molded products thereof.

Means for Solving the Problems

As a result of intensive studies, the present inventors have found that a resin having a three-dimensional structure, in which a polylactic acid derivative having two or more functional groups is cross-linked using a flexible polymer having two or more functional groups capable of forming a cross-linking site and having Tg of lower than 30° C., and a linker, has excellent deformation-fixing ability and shape-recovering ability and also has excellent strength. The inventors have completed the present invention based on such findings.

Specifically, the present invention relates to a shape-memory resin, which has a three-dimensional structure, in which a polylactic acid derivative having two or more functional groups capable of forming a cross-linking site is cross-linked using a flexible polymer having a glass transition temperature (Tg) of lower than 30° C. and having two or more functional groups capable of forming a cross-linking site, and a linker.

In addition, the present invention relates to: a molded product, which is shaped into an original shape using the above-mentioned shape-memory resin at a temperature lower than the degradation temperature of the shape-memory resin, wherein the original shape is memorized; or a molded product shaped into the original shape, wherein the original shape thereof is deformed at a temperature that is equal to or higher than the glass transition temperature (Tg) of the shape-memory resin, and is then cooled to a temperature lower than the glass transition temperature, so that the deformed shape can be fixed.

The shape-memory resin of the present invention is able to provide: a shape-memory resin, which is formed from a polylactic acid derivative, a flexible polymer having Tg of lower than 30° C., and a linker, which has an excellent shape-memory property, high mechanical strength, and high toughness, and high durable products, for example, electronic equipments, particularly wearable electronic equipments of which shapes can be reformed easily by users; and a molded product thereof. Moreover, using a biodegradable resin, an environmental impact can be reduced when the resin is discarded.

BRIEF DESCRIPTION OF THE DRAWING

FIG. 1 is a view showing a mechanism of the shape-memory property of a shaped article of a shape-memory resin.

BEST MODE FOR CARRYING OUT THE INVENTION

The shape-memory resin of the present invention is characterized in that it has a three-dimensional structure, in which a polylactic acid derivative having two or more functional groups capable of forming a cross-linking site is cross-linked using a flexible polymer having a glass transition temperature (Tg) of lower than 30° C. and having two or more functional groups capable of forming a cross-linking site, and a linker.

[Polylactic Acid Derivative]

A polylactic acid derivative used for the shape-memory resin of the present invention has two or more functional groups capable of forming a cross-linking site, and using such functional groups as origins, it forms a three-dimensional structure. A polymer chain constitutes a reversible phase in the shape-memory resin, and a cross-linking site constitutes a frozen phase. If such functional group is capable of forming a branch structure, the polylactic acid derivative needs to have at least two functional groups. On the other hand, if it is not capable of forming such branch structure, the polylactic acid derivative needs to have at least three functional groups, or needs to use a linker having three or more functional groups. Such functional group capable of forming a cross-linking site is preferably located at the ends of the polylactic acid chains because it easily controls the formation of a reversible phase.

Polylactic acid as a main polymer of the polylactic acid derivative is a substance formed by polymerization of lactic acids. Thus, polylactic acid may include L-lactic acid, D-lactic acid, and a copolymer formed by copolymerizing another monomer having ester-forming ability. Examples of a monomer that constitutes such copolymer include hydroxycarboxylic acids such as glycolic acid, hydroxybutyric acid, hydroxyvaleric acid, hydroxypentanoic acid, or hydroxycaproic acid. Polylactic acid or a copolymer thereof can be prepared by both direct condensation of lactic acid or such lactic acid and the above-mentioned hydroxycarboxylic acid. In addition, polylactic acid or a copolymer thereof can also be produced by ring-opening copolymerization of lactide as a cyclic dimer of lactic acid or a cyclic product of such lactide and the above-mentioned hydroxycarboxylic acid. Such polylactic acid and a copolymer thereof may be: condensation polymerization products synthesized using monomers, oligomers, polymers, or the derivatives or modified products thereof, obtained from biomass materials; or natural extracts or the derivatives or modified products thereof; or synthetic products obtained from materials other than such biomass materials. In order to reduce an environmental impact when discarded, products having excellent biodegradability are particularly preferable.

As a functional group capable of forming a cross-linking site, a functional group capable of forming a cross-link by a chemical bonding is preferable in terms of a shape-memory property. Functional groups utilizing a covalent bonding such as an addition reaction, a condensation reaction, or a copolymerization reaction are preferable. Specific examples of such functional group include a hydroxy group, a carboxyl group, an isocyanate group, an amino group, or an epoxy group. Groups capable of forming an ester bonding or a urethane bonding are preferable. Among such groups, a hydroxy group having active hydrogen is particularly preferable, when polycarboxylic acid, polyisocyanate, or the like is used as a linker. As such functional group, a functional group, for example, having two or more hydroxy groups each of which has an active hydrogen is particularly preferable.

Moreover, an example of a preferred functional group used for polylactic acid is a functional group having thermo-reversible reactivity. A cross-linking site formed by such functional group having thermo-reversible reactivity has a thermo-reversible property and forms a cross-link structure at a practical temperature. Thereby, a shape-memory resin having the advantages of both a thermosetting resin and a thermoplastic resin, namely, a shape-memory resin which shows excellent shape-memory and recyclability. The thermo-reversible functional group is not particularly limited. A thermo-reversible bonding which is based on a Diels-Alder reaction is preferable. Such bonding is a hydrophobic, and thus deactivation of a functional group due to moisture or the like does not occur. Thus, such functional group can be preferably used for biomass-based polymers such as polylactic acid having a large number of ester bonding.

As a functional group capable of forming the aforementioned Diels-Alder reaction, a furan group and a maleimide group, which are capable of form a Diels-Alder bonding, are particularly preferable. The association or dissociation temperature between furan and maleimide is around 150° C. This temperature is the softening temperature of a polylactic acid derivative or higher, and the degradation temperature thereof or lower. Thereby, a crosslink can be thermo-reversible in such polylactic acid derivative, and thus the obtained shape-memory resin can be preferably used. The Diels-Alder bond formed by furan and maleimide is represented by the following formula (I):

[Formula 1]

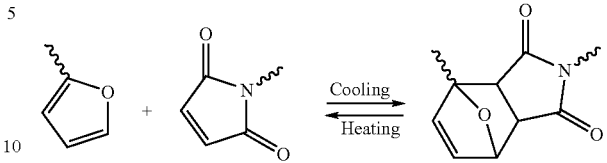

(I)

As a method for introducing two or more functional groups into a polylactic acid derivative, general chemical reactions such as an addition reaction, a condensation reaction, or a copolymerization reaction can be used. Since polylactic acid has an ester structure in the chain thereof and has a hydroxy group or a carboxylic acid group at the chain end thereof, the introduction of functional groups by a transesterification or an esterification reaction is particularly effective.

For example, in order to obtain a polylactic acid derivative having a hydroxy group acting as a functional group at the chain end thereof, the transesterification of a compound having two or more hydroxy groups with a polylactic acid derivative can be used.

Examples of such compound having two or more hydroxy groups include dihydric alcohols such as ethylene glycol, propylene glycol, dipropylene glycol, 1,3-butanediol, 1,4-butanediol or 1,6-hexanediol, trihydric alcohols such as glycerin, trimethylolpropane, trimethylolethane or hexanetriol, tetrahydric alcohols such as pentaerythritol, methyl glycoside or diglycerin, polyglycerins such as triglycerin or tetraglycerin, polypentaerythritols such as dipentaerythritol or tripentaerythritol, cycloalkane polyols such as tetrakis(hydroxymethyl)cyclohexanol, or polyvinyl alcohols. Moreover, other examples of such compound include sugar alcohols such as adonitol, arabitol, xylitol, sorbitol, mannitol, iditol, talitol and dulcitol, and sugars such as glucose, mannose glucose, mannose, fructose, sorbose, sucrose, lactose, raffinose or cellulose. Examples of polyhydric phenol include monocyclic polyhydric phenols such as pyrogallol, hydroquinone or phloroglucin, bisphenols such as bisphenol A or bisphenol sulfone, or condensation products of phenol and formaldehyde (novolac). These compounds can be used singly or in combination of two or more types.

Among these compounds, if a compound having three or more hydroxy groups is used as a compound having hydroxy groups, a polylactic acid derivative having a cross-linking point capable of forming a three-dimensional cross-linked structure can be particularly preferably formed. For example, as a result of the transesterification of pentaerythritol with a polylactic acid derivative, a polylactic acid derivative having four hydroxy groups at the ends of a molecular chain thereof can be obtained.

Alternatively, a polylactic acid derivative having a plurality of hydroxy groups can be obtained by the ring-opening polymerization of a lactide using a compound having two or more hydroxy groups as an initiator.

Moreover, in order to obtain a polylactic acid derivative having carboxyl groups acting as functional groups at the chain ends thereof, the esterification reaction of a compound having two or more carboxyl groups with a polylactic acid derivative can be applied. In particular, using an acid anhydride, a polylactic acid derivative having carboxyl groups at the chain ends thereof can be easily prepared. Examples of such acid anhydride used herein include pyromellitic dianhydride, trimellitic anhydride, phthalic anhydride, hexahydrophthalic anhydride, maleic anhydride, or the derivative thereof.

Furthermore, in order to introduce other functional groups into a polylactic acid derivative, there can be applied a method comprising esterifying the above-mentioned hydroxy groups or carboxyl groups of the polylactic acid derivative with a compound having functional groups of interest, using acid, alkali, carbodiimide, or the like as a catalyst. When a cross-linking site is formed by a Diels-Alder bond, for example, a polylactic acid having functional groups such as diene groups or dienophile groups is required. As a method for introducing such diene groups or dienophile groups into the polylactic acid derivative, there can be applied a method comprising converting carboxylic acid having a furan or maleimide group of interest to an acid chloride such as thionyl chloride or oxalyl chloride and then esterifying the hydroxy groups of the polylactic acid derivative using the acid chloride.

The number average molecular weight of a polylactic acid derivative may be from 100 to 1,000,000, preferably from 1,000 to 100,000, and more preferably from 2,000 to 50,000. If the number average molecular weight of the polylactic acid derivative is 100 or more, a shape-memory resin that is excellent in terms of mechanical characteristics and workability can be obtained. If it is 1,000,000 or less, a crosslink density that provides an excellent shape-memory property can be obtained.

[Flexible Polymer]

A flexible polymer used for the shape-memory resin of the present invention has a glass transition temperature (Tg) of lower than 30° C. and has two or more functional groups capable of forming a cross-linking site. The flexible polymer has an action to cross-link a polylactic acid derivative, together with the after-mentioned linker, so as to form a three-dimensional structure, thereby improving the toughness of a shape memory resin.

The aforementioned flexible polymer may be a condensation polymerization product synthesized using a monomer, an oligomer, a polymer, or the derivative or modified product thereof, obtained from biomass materials; or a natural extract or the derivative or modified product thereof; or a synthetic product obtained from materials other than a biomass material. Such flexible polymer is preferably a biodegradable product in order to reduce an environmental impact when discarded. Specific examples of such flexible polymer include polyesters formed by dicarboxylic acids and diols, such as polybutylene succinate, polybutylene adipate, polyethylene succinate or polyethylene adipate, polysiloxanes such as polydimethylsiloxane, polydienes such as polybutadiene or polyisoprene, polyacrylates such as polyethyl acrylate or polybutyl acrylate, polyglycerins such as polyethylene glycol, polypropylene glycol, triglycerin or tetraglycerin, polymers or oligomers such as polyvinyl alcohol, or polyols such as coconut oil or castor oil. These compounds may also be used as derivatives or modified products. They can be used singly or in combination of two or more types.

A flexible polymer has two or more functional groups. Using such functional groups as origins, the flexible polymer forms a three-dimensional structure. If functional groups are capable of forming a branch structure, the flexible polymer preferably has at least two functional groups. If a polylactic acid derivative has two functional groups, which do not form a branch structure, it is preferable that the flexible polymer preferably have at least three functional groups, or that a linker having three or more functional groups be used. Such functional group capable of forming a cross-linking site is preferably located at the end of the flexible polymer chain.

Specific examples of a functional group used for the flexible polymer are the same as those used for the above described polylactic acid derivative.

As a method for introducing two or more functional groups into a flexible polymer, the same method as that for introducing functional groups into the above described polylactic acid derivative can be adopted. For example, in a case in which the flexible polymer is a polyester synthesized from dicarboxylic acid and diol, all terminal groups can be hydroxy groups by setting the molar ratio (diol/dicarboxylic acid) between the diol and dicarboxylic acid used at greater than 1. On the other hand, all terminal groups can be carboxyl groups by setting the molar ratio (diol/dicarboxylic acid) at smaller than 1. Moreover, as a result of the transesterification of the flexible polymer with a compound having two or more hydroxyl groups, a polyester having hydroxyl groups as terminal groups can be obtained. Furthermore, as a result of the reaction of the flexible polymer with polyisocyanate or an epoxy compound having three or more functional groups, the number of functional groups of hydroxy groups in the flexible polymer can be increased.

A polymer having hydroxyl groups, such as polyglycerin or polyol, can be subjected to various types of chemical reactions of hydroxyl groups, such as esterification or etherification. In the case of polydiene, polyacrylate, or the like, various functional groups can be introduced therein during polymerization, using a polymerization initiator or end-capping agent having functional groups. In addition, it is also effective that such resin is copolymerized with a resin having no functional groups. It is to be noted that a resin having carboxyl groups at the chain end portion thereof or a compound having unreacted hydroxyl groups can be easily purified and eliminated.

The number average molecular weight of a flexible polymer may be from 100 to 1,000,000, preferably from 500 to 100,000, and more preferably from 1,000 to 50,000. If the number average molecular weight of the flexible polymer is 100 or more, a shape-memory resin that is excellent in terms of mechanical characteristics and workability can be obtained. If it is 1,000,000 or less, a crosslink density that provides an excellent shape memory property can be obtained.

Such flexible polymer has Tg of lower than 30° C. If the Tg of the flexible polymer is lower than 30° C., the flexible polymer becomes soft at a temperature of lower than 30° C. and it exhibits a rubber-like property. As a result, the toughness of a shape-memory resin can be improved, and the improvement of impact characteristics can also be anticipated.

As a glass transition temperature (Tg), a value measured using a DSC measurement device manufactured by Seiko Instruments Inc. (product name: DSC6000) at a temperature-increasing rate of 10° C./min can be adopted.

[Linker]

A linker used for the shape-memory resin of the present invention has at least two functional groups that bind to functional groups capable of forming a cross-linking site of a polylactic acid derivative or flexible polymer, and thus it constitutes a cross-linking site. When the functional groups of such polylactic acid derivative or flexible polymer do not form a branch structure, it is necessary that the functional groups of the linker be capable of forming a branch structure, or that the linker have three or more functional groups. Specific examples of the functional groups of the linker, which are in the form of a combination with the functional groups of a polylactic acid derivative or flexible polymer, include: a hydroxy group and a carboxyl group or an isocyanate group;

an amino group and an isocyanate group or a carboxyl group; and an epoxy group and a hydroxy group or an amino group or a carboxyl group. A combination of a hydroxy group used as a functional group of such polylactic acid derivative or flexible polymer with an isocyanate group used as a functional group of a linker is particularly preferable.

As a linker having an isocyanate group as a functional group, polyisocyanate having a plurality of isocyanate groups is preferable. Specific examples of such polyisocyanate include carbodiimide modified MDI, hexamethylene diisocyanate, trimethylhexamethylene diisocyanate, tolylene diisocyanate, naphthylene diisocyanate, lysine diisocyanate, or lysine triisocyanate. Of these, in particular, lysine diisocyanate and lysine triisocyanate, which can be derived from amino acids, are preferable because they are natural product-derived linkers.

Moreover, functional groups used for the linker include thermoreversibly reactive functional groups such as a furan group or a maleimide group, which is based on aforementioned Diels-Alder reaction.

An example of a linker having a maleimide group is a maleimide derivative synthesized from polyamine having at least two amino groups in a single molecule thereof. Specific examples of such maleimide derivative include maleimide derivatives obtained using aliphatic diamines such as 1,6-hexanediaimine, 1,8-octanediamine, 1,10-decanediamine, 1,12-dodecanediamine, 4,9-dioxa-1,12-dodecanediamine or bis(3-aminopropyl)amine; aliphatic polyamines such as PAMAM, polyallylamine, polylysine or polyvinylamine; O,O'-bis(3-aminopropyl)polyethylene glycol; O,O'-bis(3-aminopropyldimethylsilyl)polydimethylsiloxane; or the like. Maleimide derivatives obtained from naturally occurring amino compounds are preferable from the viewpoint of environmental issues.

Alternatively, the use of maleimide derivatives having functional groups is also effective. For example, a multifunctional maleimide linker obtained as a result of a reaction of maleimide carboxylate obtained from amino acid, maleimide carboxylate and polyol, or a polyepoxidated compound and polyamine, may also be used.

As a linker having a furan group, there can be used a compound obtained as a result of a reaction of a furan derivative having functional groups, such as furfuryl alcohol, furfurylamine, furfural, furanmethanethiol or furfuryl glycidyl ether, with a compound having two or more functional groups that can be reacted with such functional groups. Examples of such functional group include a hydroxy group, an isocyanate group, an epoxy group, or a carboxylic acid group. An example of such linker is a multifunctional furan linker obtained by reacting furfuryl alcohol with polyisocyanate.

[Shape-Memory Resin]

The shape-memory resin of the present invention has a three-dimensional structure in which the above described polylactic acid derivative is cross-linked with a flexible polymer and a linker. Such crosslink is formed as a result that the functional groups of the polylactic acid derivative directly bind to one another or that the aforementioned functional groups bind to one another via a flexible polymer, a linker, or a binding body of the flexible polymer and the linker. The binding portion of the functional groups in a cross-linking site serves as a frozen phase in the shape-memory resin, and the polylactic acid derivative between such cross-linking sites serves as a reversible phase.

In the above described shape memory resin, the mass ratio between the polylactic acid derivative and the flexible polymer is preferably 95:5 to 50:50, more preferably 95:5 to 55:45, and further preferably 95:5 to 60:40. With regard to the aforementioned mass ratio, if the mass of the polylactic acid derivative is 95 or less, the obtained product has high toughness and low elasticity, and the improvement of shock resistance and drop impact resistance can also be anticipated. The crystallinity of the polylactic acid is decreased by cross-linking, and a transparent product can be obtained. Moreover, if the mass of the polylactic acid derivative is 50 or more, the obtained product has high strength and excellent durability. On the other hand, if the mass of the polylactic acid derivative is less than 50, the obtained product has high toughness, but its strength is decreased. Furthermore, when the flexible polymer is a crystalline polymer, it becomes crystallized if the mass of the flexible polymer exceeds 50. As a result, the strength and shape-memory property of the molded product are unfavorably reduced, and its transparency is also lost. The amount of a linker used is adjusted depending on the crosslink density of a shape memory resin to be formed. In terms of strength, the amount of a resin and the amount of a linker are preferably adjusted, such that the molar ratio of two types of functional groups capable of forming a cross-linking site, for example, the molar ratio of a hydroxyl group and an isocyanate group, or the molar ratio of a furan group and a maleimide group, can be 0.9 to 1.1:1.

The above described crosslink can be formed, at the same time of shaping of a molded product, by mixing the previously prepared unhardened polylactic acid derivative, a flexible polymer and a linker, then partially reacting them for cross-linking so as to prepare a polymer composition (a prepolymer), and then cross-linking and hardening the composition. Alternatively, the crosslink can also be formed, at the same time of shaping of a molded product, by mixing an unhardened polylactic acid derivative, a flexible polymer and a linker to prepare an unhardened composition (a mixed composition), and then cross-linking and hardening the composition. Moreover, such polymer composition or unhardened composition is dissolved in a solvent such as chloroform, and it is then cast, so as to prepare a shape-memory resin film. For such cross-linking and hardening operations, a catalyst may be used as necessary. In the case of the reaction of a hydroxy group with an isocyanate group, for example, tertiary amine such as triethylenediamine or an organic metal compound such as tin dibutyl dilaurate may be used as a catalyst.

The shape-memory resin of the present invention has Tg preferably from 30° C. or higher to 100° C. or lower, and more preferably from 35° C. or higher to 80° C. or lower. If the Tg of the shape-memory resin is 30° C. or higher, a molded product using the shape-memory resin is able to retain its shape. If the Tg of the shape-memory resin is 100° C. or lower, a molded product is easily heated using a dryer or hot water, and its shape can be deformed, or the deformed shape can be recovered to the memorized original shape. Thus, the Tg in aforementioned temperature range is practical and thus preferable. Moreover, when a molded product is used by directly contacting or wearing it with a body, Tg is preferably 80° C. or lower in order to prevent burns. Furthermore, if Tg is from 30° C. or higher to 40° C. or lower, the resin can be preferably deformed, for example, with body temperature, without using a dryer or hot water. The Tg of the shape-memory resin can be adjusted by changing the crosslink density. Specifically, the Tg of the shape-memory resin can be increased by decreasing the molecular weight of the polylactic acid derivative or flexible polymer, or by increasing the number of functional groups thereof, thereby increasing the crosslink density. On the other hand, the Tg of the shape-memory resin can be decreased by increasing the molecular weight of the polylactic acid derivative or flexible polymer, or by decreasing the number of functional groups thereof, thereby decreasing the crosslink density.

Still further, the shape-memory resin of the present invention preferably has a flexural strength of 50 MPa or more. If the flexural strength of the shape-memory resin is 50 MPa or more, a molded product having excellent durability can be obtained. The flexural strength of the shape-memory resin can be adjusted by changing the crosslink density. As such flexural strength, a measurement value obtained by measuring flexural strength (maximum flexural stress) according to a three-point flexural test using a universal testing machine (5567) manufactured by Instron Japan Co., Ltd. can be adopted.

Further, the shape-memory resin of the present invention preferably has a elongation at break of 5% or more. If the elongation at break of the shape-memory resin is 5% or more, a molded product having excellent toughness can be obtained. The elongation at break of the molded product resin can be adjusted by changing the crosslink density. As such elongation at break, a measurement value obtained by measuring elongation at break according to a three-point flexural test using the same testing machine as that used in the aforementioned measurement of flexural strength can be adopted.

The above described shape-memory resin may appropriately comprise additives such as an inorganic filler, an organic filler, a reinforcing material, a coloring agent, a stabilizer (a radical scavenger, an antioxidant, etc.), an antimicrobial agent, an antifungal material and a fire retardant, as necessary, within the range that does not impair the characteristics thereof. Inorganic fillers that can be used herein include silica, alumina, talc, sand, clay, slag, or the like. Organic fillers that can be used herein include organic fibers such as polyamide fibers or plant fibers. Reinforcing agents that can be used herein include glass fibers, carbon fibers, polyamide fibers, polyallylate fibers, a needle-like inorganic material, a fibrous fluorocarbon resin, or the like. Antimicrobial agents that can be used herein include silver ion, copper ion, zeolite containing such ions, or the like. Fire retardants that can be used herein include a silicon fire retardant, a bromine fire retardant, a phosphorus fire retardant, an inorganic fire retardant, a or the like. As hydrolysis resistant stabilizers, a carbodiimide modifier or the like can be used.

The molded product of the present invention is shaped to an original shape, using the above described shape-memory resin at a temperature that is lower than the degradation temperature of the shape-memory resin. Thereafter, the original shape is deformed at a temperature that is equal to or higher than the Tg of the shape-memory resin, and it is then cooled to a temperature lower than the Tg, so that the thus deformed shape can be fixed.

The above-mentioned molded product may be produced by shaping the above described shape-memory resin to an original shape to be memorized, at a temperature lower than the degradation temperature of a polylactic acid derivative, according to a molding method such as transfer molding, RIM molding, compression molding, foam molding or light curing molding. Moreover, when a shape-memory resin whose cross-linking site is formed by a thermo-reversible bonding is used, a common method of molding a thermoplastic resin, such as an injection molding method, can be used.

A method of using the molded product of the present invention will be described. A shape article having an original shape is deformed by heating it to a temperature equal to or higher than the Tg of the above described shape-memory resin, and the deformed product is then fixed by cooling it to a temperature lower than the Tg of the shape-memory resin, so as to obtain a molded product having a deformed shape. In the case of the molded product having a deformed shape, its deformed shape is maintained unless it is heated to a temperature equal to or higher than the Tg of the above described shape-memory resin.

Furthermore, the molded product having a deformed shape is heated to a temperature equal to or higher than the Tg of the shape-memory resin, so that its original shape can be recovered, and thereafter, it is cooled to a temperature lower than the Tg of the shape-memory resin, so that the recovered original shape can be fixed and it can be used as a molded product having its original shape.

Still further, a molded product, which is produced using a shape-memory resin whose cross-linking site is formed by a thermo-reversible bonding, is deformed by heating it to a temperature that is equal to or higher than the Tg of the resin and is equal to or lower than the cleavage temperature of the cross-linking site, and it is then cooled to a temperature lower than the Tg of the resin, so as to obtain a molded product having a deformed shape that has been fixed. Further, the molded product is then heated to a temperature that is equal to or higher than the Tg of the resin and is equal to or lower than the cleavage temperature of the cross-linking site, so that the original shape can be recovered. Further, the molded product is heated to a temperature that is equal to or higher than the cleavage temperature of the cross-linking site and is lower than the degradation temperature of the resin, so that the crosslink can be cleaved and reshaped, and so that it can be used as a recycled molded product.

The above described molded product can be applied to electric and electronic equipments such as a case for an electric appliance that requires high durability and high toughness, eyeglasses, hearing aids, casts, ballot papers, etc. When the molded product is discarded, if it is left in the environment without burning it, it easily becomes biodegradable by the action of sunlight or water, or by being incorporated into a biocycle.

EXAMPLES

The present invention will be described more in detail in the following examples. However, these examples are not intended to limit the technical scope of the present invention.

Hereinafter, commercially available high-purity products were used as reagents and the like, unless otherwise specified. In addition, a number average molecular weight was calculated based on the concentration of a hydroxy group measured by NMR, or was measured by a gel permeation chromatogram method. The obtained value was then converted to a value relative to standard polystyrene.

Example 1

Synthesis of Terminal Hydroxy Polylactic Acid 2220 g of polylactic acid (Terramac; manufactured by Unitika Ltd.) and 76.8 g of sorbitol were melted and mixed at 210° C. for 12 hours to carry out a transesterification, so as to obtain an ester compound. A solution obtained by dissolving this ester compound in 5 L of chloroform was poured into an excessive amount of methanol, and it was reprecipitated, so as to obtain terminal hydroxy polylactic acid [R1]. Its number average molecular weight was 7300, and its Tg was 46.8° C.

[Formula 2]

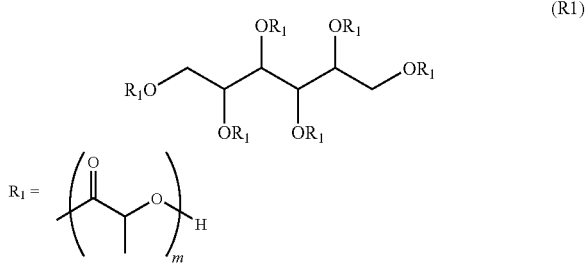

[Synthesis of Flexible Polymer (Terminal Hydroxy Polybutylene Succinate (PBS))]

117 g of succinic anhydride and 128 g of 1,4-butanediol were heated at 190° C. for 4 hours, and they were then further heated under a reduced pressure for 2 hours, to carry out a dehydration condensation reaction, thereby obtaining an ester compound. A solution obtained by dissolving this ester compound in 200 mL of chloroform was poured into an excessive amount of methanol, and it was reprecipitated, so as to obtain terminal hydroxy polybutylene succinate [R2]. Its number average molecular weight was 2300, and its Tg was −40° C.

[Formula 3]

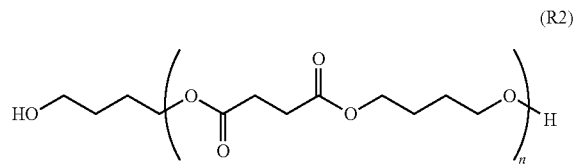

The obtained [R1] and [R2] were melted and mixed at the composition ratio shown in Table 1 (170° C.), and lysine triisocyanate used as a linker was then added to the mixture. The linker was added thereto, such that the amounts of terminal hydroxy groups in [R1] and [R2] could be equimolar to the amounts of isocyanate groups in the linker. Thereafter, the mixture was subjected to compression molding at 170° C. for 2 hours, so as to obtain a polylactic acid cross-linked product in the form of a film.

A sample was cut out of the obtained polylactic acid cross-linked product film, and its flexural strength, elongation at break, and Tg were then measured by the above described methods. Thereafter, its shape-memory property was evaluated by the method as described below. The results are shown in Table 2.

[Shape Memory Property]

A sample with a size of 2 cm×5 cm×1.8 mm was cut out of the obtained polylactic acid cross-linked product film. This sample was heated at Tg+20° C. Thereafter, the center of the sample was folded at 90° to deform it for 5 seconds, and it was then cooled to an ordinary temperature. At this time, the shape-retaining property of the sample was evaluated using an angle (A1) in accordance with the following standards. $80°≦A1≦100°$: ○; $70°≦A1≦80°$, or $100°<A1≦110°$: Δ; $0°≦A1<70°$, or $110°<A1≦180°$: ×.

Moreover, this sample was heated again at Tg+20° C. for 3 minutes, and the shape-recovering property of the sample was then evaluated using an angle (A2) in accordance with the following standards. $170°≦A2≦180°$: ○; $160°≦A2<170°$: Δ; $0°≦A2<160°$: ×. The results are shown in Table 2.

TABLE 1

| | Shape-retaining property (A1) | | Shape-recovering property (A2) | |
|---|---|---|---|---|
| | ○ | 80° ≦ A1 ≦ 100° | ○ | 170° ≦ A2 ≦ 180° |
| | Δ | 70° ≦ A1 < 80° 100° < A1 ≦ 110° | Δ | 160° ≦ A2 < 170° |
| | × | 0° ≦ A1 < 70° 110° < A1 ≦ 180° | × | 0° ≦ A2 < 160° |

TABLE 2

| Composition (wt %) | | Amount of linker added | Physical properties of cross-linked PLA | | | | |
|---|---|---|---|---|---|---|---|
| PLA (Terminal hydroxy PLA) | Flexible polymer (Terminal hydroxy PBS) | (mg/polymer 1 g) Linker (Lysine triisocyanate) | Bending strength (MPa) | Elongation at break (%) | Tg (° C.) | Shape-retaining property | Shape-recovering property |
| 100 | 0 | 73.6 | 121 | 4.1 | 60.5 | ○ | ○ |
| 95 | 5 | 74.6 | 120 | >10 | 57.1 | ○ | ○ |
| 90 | 10 | 75.6 | 100 | >10 | 48.2 | ○ | ○ |
| 80 | 20 | 77.7 | 73.9 | >10 | 36.8 | ○ | ○ |
| 70 | 30 | 79.7 | 60.3 | >10 | 35.1 | ○ | ○ |
| 60 | 40 | 81.7 | 51.5 | >10 | 31.3 | Δ | ○ |
| 50 | 50 | 83.7 | 22.0 | >10 | 21.5 | X | X |

Example 2

As a flexible polymer, polybutylene succinate [R3] (Bionore: manufactured by Showa Highpolymer Co., Ltd.) (number average molecular weight=21300; Tg=−32° C.) was used.

[Formula 4]

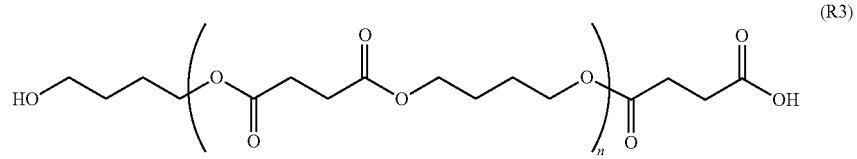

[R1] and [R3] were melted and mixed (170° C.) at the composition ratio shown in Table 2, and lysine triisocyanate used as a linker was then added to the mixture. The linker was added thereto, such that the amounts of terminal hydroxy groups in [R1] and [R3] could be equimolar to the amounts of isocyanate groups in the linker. Thereafter, the mixture was subjected to compression molding at 170° C. for 2 hours, so as to obtain a polylactic acid cross-linked product. The results obtained by evaluating the flexural strength, elongation at break, Tg, and shape-memory property of the obtained polylactic acid cross-linked product are shown in Table 3.

TABLE 3

| Composition (wt %) | | Amount of linker added | Physical properties of cross-linked PLA | | | | |
|---|---|---|---|---|---|---|---|
| PLA (Terminal hydroxy PLA) | Flexible polymer (Bionore) | (mg/polymer 1 g) Linker (Lysine triisocyanate) | Bending strength (MPa) | Elongation at break (%) | Tg (° C.) | Shape-retaining property | Shape-recovering property |
| 100 | 0 | 73.6 | 121 | 4.1 | 60.5 | ○ | ○ |
| 95 | 5 | 70.3 | 112 | >10 | 51.6 | ○ | ○ |
| 90 | 10 | 66.8 | 97.4 | >10 | 50.2 | ○ | ○ |
| 80 | 20 | 60.0 | 73.8 | >10 | 40.3 | ○ | ○ |
| 70 | 30 | 53.2 | 65.1 | >10 | 38.1 | ○ | ○ |
| 60 | 40 | 46.4 | 59.2 | >10 | 34.1 | Δ | ○ |
| 50 | 50 | 39.6 | 31.1 | >10 | 24.3 | X | X |

Example 3

Synthesis of Maleimide Group-Containing Polylactic Acid 25.0 g of β-alanine, 28.9 g of maleic anhydride, and 100 mL of THF were stirred in a nitrogen atmosphere at a room temperature for 24 hours. Thereafter, a solid was filtrated to obtain maleamide propionic acid [R4] (yield: 96%). Subsequently, 22.1 g of [R4], 6.11 g of orthophosphoric acid, 0.0937 g of BHT, 100 mL of xylene, 300 mL of toluene, and 20 mL of dioxane were each weighed, and they were then refluxed in a three-necked flask for 3 hours. The reaction temperature was 116° C. Thereafter, the reaction solution was cooled to a room temperature, and the solvent was then distilled away under a reduced pressure. The obtained solid was dissolved in chloroform. Thereafter, the chloroform was distilled away from this solution under a reduced pressure, and the solid was then recrystallized from diethyl ether, so as to obtain maleimide carboxylic acid [R5].

[Formula 5]

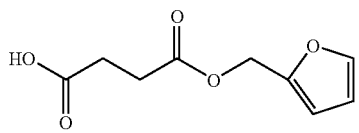

(R5)

6.25 g of [R5] was dissolved in 90 mL of chloroform, and the solution was then cooled to 0° C. Thereafter, 12.2 g of oxalyl dichloride was added dropwise to the reaction solution. The obtained mixture was stirred in a nitrogen atmosphere at a room temperature for 5 hours, and the solvent and excessive oxalyl dichloride were then distilled away under a reduced pressure, so as to obtain maleimide carboxylic acid chloride [R6]. Such [R6] was diluted with a small amount of chloroform, and the diluted solution was then added dropwise to a solution of 9.14 g of [R1], 6.59 mL of pyridine, and 30 mL of chloroform. The obtained mixture was stirred in a nitrogen atmosphere at a room temperature for 30 minutes. Thereafter, the reaction solution was poured into a mixed solvent of methanol and water (methanol: 350 mL; water: 50 mL), and the precipitated solid was then filtrated to obtain maleimide-modified polylactic acid [R7]. This compound had a number average molecular weight of 7500, Tg of 55° C., and a degree of maleimide modification of 6. The degree of maleimide modification indicates the number of moles of maleimide groups per mole of polylactic acid.

[Formula 6]

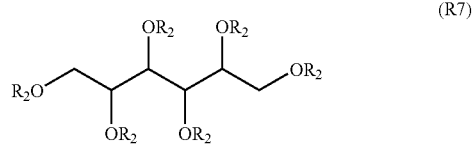

(R7)

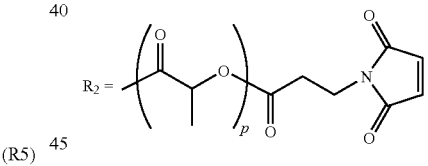

[Synthesis of Furan Group-Containing Polybutylene Succinate]

42.5 g of lysine diisocyanate and 0.2 mL of tin dibutyl dilaurate were dissolved in 300 mL of dioxane, and 30.0 g of terminal hydroxyl polybutylene succinate [R2] was then added dropwise to the obtained solution. The obtained mixture was reacted at 80° C. for 2 hours. Thereafter, 39.3 g of furfuryl alcohol was further added dropwise to the reaction solution, and the obtained mixture was then reacted at 80° C. for 5 hours. Thereafter, the solvent was distilled away under a reduced pressure, and the obtained solid was then dissolved in 500 mL of chloroform. This chloroform solution was washed with the same amount of water three times, and it was then dried over magnesium sulfate. Thereafter, this chloroform solution was poured into an excessive amount of methanol for reprecipitation, so as to obtain furan modified PBS [R8]. The obtained furan modified PBS [R8] had a number average molecular weight of 4400 and Tg of −21° C.

[Formula 7]

(R8)

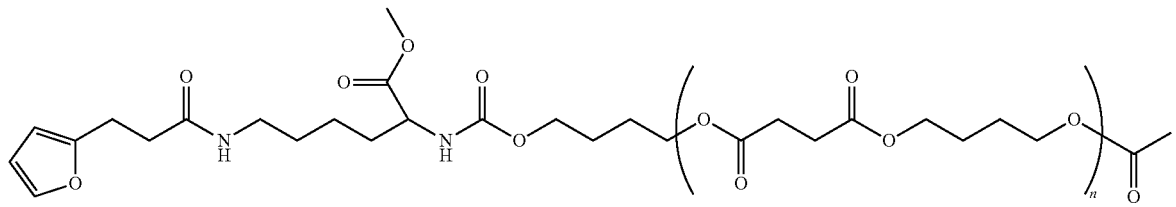

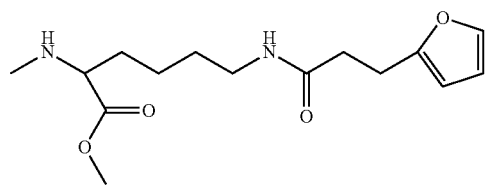

[Synthesis of Furan Linker]

40.0 g of furfuryl alcohol and 0.2 mL of tin dibutyl dilaurate were dissolved in 150 mL of dioxane, and 24.2 g of lysine triisocyanate was then added dropwise to the obtained solution. The obtained mixture was reacted at 60° C. for 6 hours. Thereafter, the solvent was distilled away under a reduced pressure, and the obtained solid was then dissolved in 200 mL of chloroform. This chloroform solution was washed with 200 mL of water three times, and it was then dried over magnesium sulfate. Thereafter, the chloroform was distilled away under a reduced pressure. The obtained crude product was recrystallized from ethyl acetate, so as to obtain a furan linker [R9].

stirring operation, 1 L of water was added to the reaction solution, and the solvent was distilled away at 60° C. under a reduced pressure. Thereafter, the obtained solid was dissolved in chloroform, and this chloroform solution was then washed with water. Chloroform was distilled away from the chloroform solution under a reduced pressure, and the remaining solution was then purified by silica gel chromatography (developing solvent: ethyl acetate). Thereafter, the resultant was refluxed in toluene in a nitrogen atmosphere for 24 hours, followed by recrystallization, so as to obtain maleimide with three functional groups [R10] (yield: 52%).

[Formula 8]

(R9)

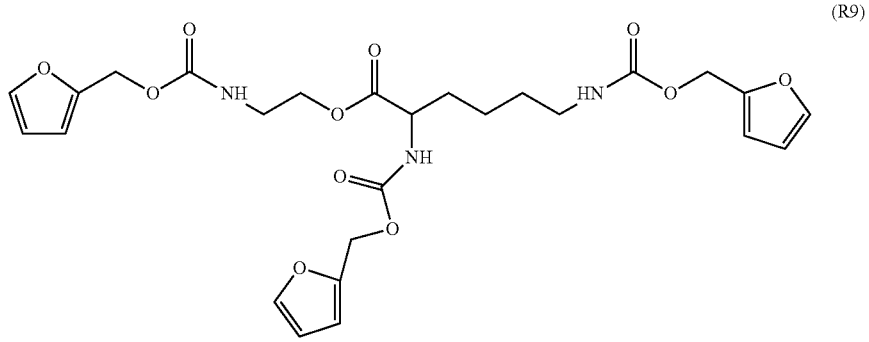

[Synthesis of Maleimide Linker]

25 mL of tris(2-aminoethyl)amine dissolved in 100 mL of DMF was heated to 75° C., and 100 g of exo-3,6-epoxy-1,2,3,6-tetrahydrophthalic anhydride dissolved in 250 mL of DMF was then added dropwise thereto over 1 hour. The obtained mixture was stirred for 2 hours. Thereafter, 200 mL of acetic anhydride, 10 mL of triethylamine, and 1 g of nickel acetate were added to the reaction solution, and the obtained mixture was then stirred for 3 hours. After completion of the

[Formula 9]

(R10)

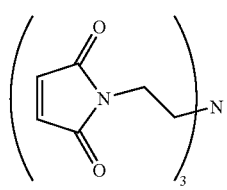

The obtained [R7] and [R8] were melted and mixed at the composition ratio shown in Table 3 (160° C.), and [R9] or [R10] was then added thereto as a linker. In the composition ratio range of 100:0 to 60:40, the linker was added, such that the amounts of terminal maleimide groups in [R7] could be equimolar to the amounts of furan groups in [R8] and [R9]. At the composition ratio of 50:50, the linker was added, such that the amounts of terminal maleimide groups in [R7] and [R10] could be equimolar to the amounts of furan groups in [R8]. Thereafter, the obtained mixture was subjected to compression molding at 160° C., and the resultant was then heated at 100° C. for 1 hour, and then at 75° C. for 20 hours, so as to obtain a polylactic acid cross-linked product [R11]. The results obtained by evaluating the flexural strength, elongation at break, Tg, and shape-memory property of the obtained polylactic acid cross-linked product are shown in Table 4.

The results of Examples 1-3 show the following. All of the molded products using the shape-memory resins of the present invention had high elongation at break and excellent toughness. In particular, if using a shape-memory resin, in which the mass ratio between a polylactic acid derivative and a flexible polymer is from 95:5 to 60:40, a shape-memory product having a flexural strength of 50 MPa or more and a elongation at break of 5% or more can be obtained, regardless of the molecular weight of the flexible polymer and the type of a binding site, and thus, it is found that Tg can be controlled by the mass ratio between the polylactic acid and the flexible polymer. On the other hand, in a case in which the mass ratio between the polylactic acid derivative and the flexible polymer in the shape-memory resin is 100:0, the obtained molded product has high flexural strength and an excellent shape-

TABLE 4

| Composition (wt %) | | Amount of linker added (mg/polymer 1 g) | | Physical properties of cross-linked PLA | | | | |
|---|---|---|---|---|---|---|---|---|
| PLA (Maleimide modified PLA) | Flexible polymer (Furan modified PBS) | Linker (Furan with three functional groups) | (Maleimide with three functional groups) | Bending strength (MPa) | Elongation at break (%) | Tg (° C.) | Shape-retaining property | Shape-recovering property |
| 100 | 0 | 78.3 | — | 105 | 2.7 | 66.5 | ○ | ○ |
| 95 | 5 | 68.9 | — | 97.8 | 5.5 | 46.8 | ○ | ○ |
| 90 | 10 | 59.6 | — | 93.4 | 7.9 | 46.3 | ○ | ○ |
| 80 | 20 | 40.9 | — | 80.7 | >10 | 38.0 | ○ | ○ |
| 70 | 30 | 22.2 | — | 62.8 | 7.1 | 36.0 | ○ | ○ |
| 60 | 40 | 3.48 | — | 58.4 | 6.6 | 32.2 | Δ | ○ |
| 50 | 50 | — | 10.5 | 41.2 | 5.1 | 28.6 | X | X |

Comparative Example 1

[R7] and [R3] were melted and mixed at the composition ratio shown in Table 5 (160° C.), and [R9] was then added thereto as a linker. The linker was added thereto, such that the amounts of terminal maleimide groups in [R7] could be equimolar to the amounts of furan groups in [R9]. Thereafter, the obtained mixture was subjected to compression molding at 160° C., and the resultant was then heated at 100° C. for 1 hour, and then at 75° C. for 20 hours, so as to obtain a polylactic acid cross-linked product [R12] in the form of a film. The flexural strength, elongation at break, Tg, and shape-memory property of the obtained polylactic acid cross-linked product film were evaluated in the same manner as that of Example 1. The results are shown in Table 5.

memory property, but it has low elongation at break. Moreover, it is also found that, if the mass ratio of the flexible polymer in the shape-memory resin is increased, the elongation at break of the obtained molded product tends to be improved, and the strength and shape-memory property thereof tend to be deteriorated.

In Comparative Example 1, regardless of the mass ratio between the polylactic acid derivative and the flexible polymer in the shape-memory resin, the toughness of the obtained molded product cannot be improved. Hence, it is found that the functional groups (maleimide groups) in the polylactic acid derivative and the functional groups (hydroxy groups or carboxyl groups) in the flexible polymer do not form a crosslink, and that the molded product, into the three-dimensional structure of which the flexible polymer has not been incorporated, is not able to improve its toughness.

TABLE 5

| Composition (wt %) | | Amount of linker added (mg/polymer 1 g) | Physical properties of cross-linked PLA | |
|---|---|---|---|---|
| PLA (Maleimide modified PLA) | Flexible polymer (Bionore) | Linker (Furan with three functional groups) | Bending strength (MPa) | Elongation at break (%) |
| 100 | 0 | 78.3 | 105 | 2.7 |
| 95 | 5 | 74.4 | 93.6 | 2.5 |
| 90 | 10 | 70.4 | 83.9 | 2.5 |
| 80 | 20 | 62.6 | 59.8 | 2.4 |
| 70 | 30 | 54.8 | 57.3 | 2.8 |
| 60 | 40 | 47.0 | 45.4 | 3.1 |
| 50 | 50 | 39.1 | 31.3 | 3.5 |

Example 4

As a flexible oligomer, castor oil [R13] (URIC H-30: manufactured by Itoh Oil Chemical Co., Ltd.) (number average molecular weight: 930; freezing point: −18° C.) was used.

[R1] and [R13] were melted and mixed at the composition ratio shown in Table 6 (170° C.), and lysine triisocyanate was then added thereto as a linker. The linker was added thereto, such that the amounts of hydroxy groups in [R1] and [R13] could be equimolar to the amounts of isocyanate groups in the linker. Thereafter, the obtained mixture was subjected to compression molding at 170° C. for 2 hours, so as to obtain a polylactic acid cross-linked product in the form of a film.

[Formula 10]

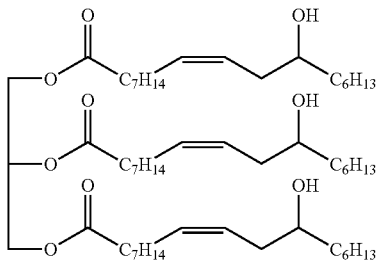

(R13)

Example 5

Synthesis of Flexible Polymer

Terminal Hydroxyl Polybutylene Succinate Adipate (PBSA)

94 g of succinic acid, 29 g of adipic acid, and 95 g of 1,4-butanediol were subjected to dehydration condensation in a nitrogen atmosphere at 180° C. to 220° C. for 7 hours. Subsequently, the resultant was subjected to a deglycol reaction under a reduced pressure at 180° C. to 220° C. for 1.0 hour, so as to obtain an ester compound. This ester compound was dissolved in 200 mL of chloroform, and the obtained

TABLE 6

| Composition (wt %) | | Amount of linker added | Physical properties of cross-linked PLA | | | | |
|---|---|---|---|---|---|---|---|
| PLA (Terminal hydroxy PLA) | Flexible polymer (Castor oil) | (mg/polymer 1 g) Linker (Lysine triisocyanate) | Bending strength (MPa) | Elongation at break (%) | Tg (° C.) | Shape-retaining property | Shape-recovering property |
| 100 | 0  | 73.6 | 121  | 4.1 | 60.5 | ○ | ○ |
| 95  | 5  | 81.0 | 108  | >10 | 56.2 | ○ | ○ |
| 90  | 10 | 90.1 | 97.9 | >10 | 56.7 | ○ | ○ |
| 80  | 20 | 108  | 82.1 | >10 | 50.0 | ○ | ○ |
| 70  | 30 | 127  | 74.8 | >10 | 48.0 | ○ | ○ |
| 60  | 40 | 145  | 65.6 | >10 | 38.7 | ○ | ○ |
| 50  | 50 | 163  | 50.1 | >10 | 35.2 | ○ | ○ |
| 45  | 55 | 172  | 31.1 | >10 | 25.7 | X | X |

The results of Example 4 show the following. The molded products using the shape-memory resins of the present invention had high elongation at break and excellent toughness. In particular, it is found that, if using a shape-memory resin, in which the mass ratio between a polylactic acid derivative and a flexible polymer (castor oil) is from 95:5 to 50:50, a shape-memory product having a flexural strength of 50 MPa or more and a elongation at break of 5% or more can be obtained. As with the results of Examples 1-3, as the mass ratio of castor oil increases, the strength of the obtained molded product decreases. Tg can be controlled by the ratio between the polylactic acid and the castor oil.

solution was then poured into an excessive amount of methanol for reprecipitation, so as to obtain polybutylene succinate adipate [R14] having hydroxyl groups at both termini. The obtained polybutylene succinate adipate [R14] had a number average molecular weight (NMR) of 1650 and Tg of −45° C.

[Formula 11]

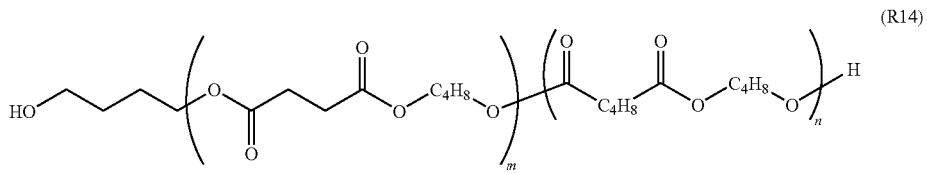

(R14)

The obtained [R1] and [R14] were melted and mixed at the composition ratio shown in Table 7 (170° C.), and 1,6-hexamethylene diisocyanate homopolymer (TPA-100: manufactured by Asahi Kasei Chemicals Corporation) [R15] was then added thereto as a linker. The linker was added thereto, such that the amounts of terminal hydroxy groups in [R1] and [R14] could be equimolar to the amounts of isocyanate groups in the linker. Thereafter, the obtained mixture was subjected to compression molding at 170° C. for 2 hours, so as to obtain a polylactic acid cross-linked product in the form of a film.

[Formula 12]

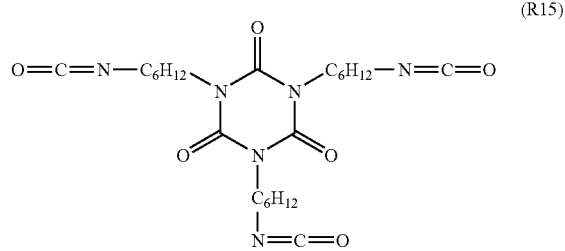

(R15)

TABLE 7

| Composition (wt %) | | Amount of linker added | Physical properties of cross-linked PLA | | | | |
|---|---|---|---|---|---|---|---|
| PLA (Terminal hydroxy PLA) | Flexible polymer (Terminal hydroxy PBS) | (mg/polymer 1 g) Linker (Polyisocyanate) | Bending strength (MPa) | Elongation at break (%) | Tg (° C.) | Shape-retaining property | Shape-recovering property |
| 100 | 0 | 145 | 114 | 3.2 | 55.8 | ◯ | ◯ |
| 95 | 5 | 149 | 103 | >10 | 53.2 | ◯ | ◯ |
| 90 | 10 | 153 | 94.1 | >10 | 50.1 | ◯ | ◯ |
| 80 | 20 | 160 | 72.3 | >10 | 45.9 | ◯ | ◯ |
| 70 | 30 | 168 | 68.7 | >10 | 35.8 | ◯ | ◯ |
| 60 | 40 | 175 | 51.0 | >10 | 30.9 | Δ | ◯ |
| 50 | 50 | 183 | 36.4 | >10 | 23.8 | X | X |

The results of Example 5 show the following. All of the molded products using the shape-memory resins of the present invention had high elongation at break and excellent toughness. In particular, it is found that, if using a shape-memory resin, in which the mass ratio between a polylactic acid derivative and a flexible polymer (PBSA) is from 95:5 to 60:40, a shape-memory product having a flexural strength of 50 MPa or more and a elongation at break of 5% or more can be obtained. As with the results of Examples 1-4, as the mass of PBSA in the shape-memory resin increases, the strength of the obtained molded product decreases. Tg can be controlled by the ratio between the polylactic acid and the PBSA.

The present application is an application claiming priority from the patent application number JP2007-298209 and JP2008-064163; all the disclosures of these basic applications are hereby incorporated by reference.

INDUSTRIAL APPLICABILITY

Thus, the molded product of the present invention, which has high strength and high toughness, and also has a shape-memory property, can be used, in various types of fields, as an exterior material for electronic equipments such as a personal computer or a mobile phone; a component such as a screw, a fastening pin, a switch, a sensor, an information recording device, a roller for office automation equipment, or a belt; a socket; a wrapping material such as a pallet; an on-off valve for air conditioner; a heat shrinkable tube; etc. Moreover, the present molded product can also be used as an automotive member such as a bumper, a wheel, or a rearview mirror; a household member such as a cast, a toy, an eye-glass frame, a hearing aid, a dental corrective wire, or bedclothes for prevention of bedsores; etc.

The invention claimed is:

1. A shape-memory resin, which has a three-dimensional structure, in which a polylactic acid derivative having two or more functional groups capable of forming a cross-linking site is cross-linked using a flexible polymer having a glass transition temperature (Tg) of lower than 30° C. and having two or more functional groups capable of forming a cross-linking site, and a linker, wherein the polylactic acid derivative and the flexible polymer are at a mass ratio of 95:5 to 60:40 and the resin has an elongation at break of 5% or more.

2. The shape-memory resin according to claim 1, wherein the functional groups capable of forming the cross-linking sites of the polylactic acid derivative and flexible polymer have two or more active hydrogens and the linker is polyisocyanate.

3. The shape-memory resin according to claim 1, wherein the cross-linking site is formed by a Diels-Alder reaction.

4. The shape-memory resin according to claim 1, wherein the flexible polymer is biodegradable.

5. The shape-memory resin according to claim 1, wherein the flexible polymer comprises polybutylene succinate.

6. A molded product, which is shaped into an original shape using the shape-memory resin according to claim 1 at a temperature lower than the degradation temperature of the shape-memory resin, wherein the original shape is memorized.

7. The molded product according to claim 6, wherein the original shape thereof is deformed at a temperature that is equal to or higher than the glass transition temperature (Tg) of the shape-memory resin, and is then cooled to a temperature lower than the glass transition temperature so that the deformed shape can be fixed.

8. A method of using the molded product according to claim 7, which comprises heating the shaped article to a temperature that is equal to or higher than the glass transition temperature (Tg) of the shape-memory resin, so as to recover the initial shape thereof.

9. The shape-memory resin according to claim 2, wherein the flexible polymer is biodegradable.

10. The shape-memory resin according to claim 3, wherein the flexible polymer is biodegradable.

11. The shape-memory resin according to claim 1, wherein the flexible polymer is biodegradable.

12. The shape-memory resin according to claim 2, wherein the flexible polymer comprises polybutylene succinate.

13. The shape-memory resin according to claim 3, wherein the flexible polymer comprises polybutylene succinate.

14. The shape-memory resin according to claim 1, wherein the flexible polymer comprises polybutylene succinate.

15. The shape-memory resin according to claim 4, wherein the flexible polymer comprises polybutylene succinate.

16. A molded product, which is shaped into an original shape using the shape-memory resin according to claim 2 at a temperature lower than the degradation temperature of the shapememory resin, wherein the original shape is memorized.

17. A molded product, which is shaped into an original shape using the shape-memory resin according to claim 3 at a temperature lower than the degradation temperature of the shape-memory resin, wherein the original shape is memorized.

* * * * *